(12) United States Patent
VanDrie et al.

(10) Patent No.: US 10,934,905 B2
(45) Date of Patent: Mar. 2, 2021

(54) RESIDUAL OIL DRAINAGE SYSTEM AND RELATED METHOD FOR REPLACING AN OIL FILTER OF AN ENGINE

(71) Applicant: Kohler Co., Kohler, WI (US)

(72) Inventors: Eric Mitchell VanDrie, Oostburg, WI (US); Mark Huibregtse, Elkhart Lake, WI (US)

(73) Assignee: KOHLER CO., Kohler, WI (US)

( * ) Notice: Subject to any disclaimer, the term of this patent is extended or adjusted under 35 U.S.C. 154(b) by 21 days.

(21) Appl. No.: 16/247,685

(22) Filed: Jan. 15, 2019

(65) Prior Publication Data
US 2019/0234260 A1   Aug. 1, 2019

Related U.S. Application Data

(60) Provisional application No. 62/622,550, filed on Jan. 26, 2018.

(51) Int. Cl.
*F01M 11/04* (2006.01)
*F01M 11/03* (2006.01)
(Continued)

(52) U.S. Cl.
CPC ......... *F01M 11/0458* (2013.01); *F01M 11/02* (2013.01); *F01M 11/03* (2013.01);
(Continued)

(58) Field of Classification Search
CPC .... F01M 11/0458; F01M 11/02; F01M 11/03; F01M 11/0408; F01M 2011/031; F01M 2011/035; F01M 2011/0425; F16N 31/002
(Continued)

(56) References Cited

U.S. PATENT DOCUMENTS 5,743,358 A * 4/1998 Bedi .................... B01D 35/306
123/196 R
5,957,240 A * 9/1999 Apostolides ......... B01D 35/306
184/1.5
(Continued)

FOREIGN PATENT DOCUMENTS

CN    1871492 A    11/2006
CN    202811001 U   3/2013
(Continued)

OTHER PUBLICATIONS

Chinese Office Action issued in Chinese Patent Application No. 201910074444.2 dated Sep. 1, 2020, along with English translation.

*Primary Examiner* — Joseph J Dallo
*Assistant Examiner* — Yi-Kai Wang
(74) *Attorney, Agent, or Firm* — The Belles Group, P.C.

(57) ABSTRACT

A residual oil drainage system for use in replacement of the oil filter of an internal combustion engine is disclosed. The drainage system may include first and second drainage conduits disposed in the oil pan of the engine. The drainage conduits may be fluidly interconnected and coupled to portions of the oil inlet and outlet flow conduits which normally convey oil to and from the oil filter. A flow control device is movable to either open or close the drainage flowpath in the system. In use with an open flowpath and engine off, residual oil captured by the first and second drainage conduits flows through the drainage system and is returned to the oil reservoir in the oil pan via gravity. In one configuration, the drainage conduits are formed internally and directly within the body of the structure of the oil pan.

20 Claims, 13 Drawing Sheets

(51) Int. Cl.
*F16N 31/00* (2006.01)
*F01M 11/02* (2006.01)
(52) U.S. Cl.
CPC ....... *F01M 11/0408* (2013.01); *F16N 31/002* (2013.01); *F01M 2011/031* (2013.01); *F01M 2011/035* (2013.01); *F01M 2011/0425* (2013.01)
(58) Field of Classification Search
USPC .................................................. 123/196 R
See application file for complete search history.

(56) References Cited

U.S. PATENT DOCUMENTS

| | | | | |
|---|---|---|---|---|
| 2013/0174802 | A1* | 7/2013 | Liimatta | ........... F01M 1/12 |
| | | | | 123/196 R |
| 2014/0096731 | A1* | 4/2014 | Yasuki | ........... F01L 1/3442 |
| | | | | 123/90.15 |
| 2016/0091077 | A1* | 3/2016 | Sotani | ........... F16H 57/021 |
| | | | | 74/606 R |

FOREIGN PATENT DOCUMENTS

| | | | |
|---|---|---|---|
| CN | 103075225 A | 5/2013 | |
| CN | 103939176 A | 7/2014 | |
| CN | 104819028 A | 8/2015 | |
| CN | 107227988 A | 10/2017 | |
| CN | 209908589 U | 1/2020 | |
| KR | 20100048566 A | 5/2010 | |

* cited by examiner

RESIDUAL OIL DRAINAGE SYSTEM AND RELATED METHOD FOR REPLACING AN OIL FILTER OF AN ENGINE

CROSS-REFERENCE TO RELATED APPLICATIONS

The present application claims the benefit of U.S. Provisional Application No. 62/622,550 filed Jan. 26, 2018; the entirety of which is incorporated herein by reference.

BACKGROUND OF THE DISCLOSURE

The present disclosure generally relates to oil lubrication systems for internal combustion engines, and more particularly to a drainage system and method for capturing residual oil associated with oil filter replacement.

Oil lubrication systems for internal combustions engines distribute oil to moving engine parts for reducing friction-related wear and cooling. Such systems may generally include an oil sump or pan, a pump, and a filter. The oil filter contains filter media which removes sediment and debris collected by the circulating oil to prevent etching of wear surfaces between intermeshing engine parts. Both the oil and filter require periodic replacement. When replacing some oil filters, residual oil trapped inside and around the filter mounting location on the engine may spill requiring either separate catch pan and/or cumbersome cleanup steps.

Improvements in minimizing oil leakage and spillage when replacing an oil filter are desired.

SUMMARY OF THE DISCLOSURE

An oil drainage system and related method are disclosed which reduce or eliminate spillage and leakage of residual engine oil when removing the oil filter of an internal combustion engine for replacement. The drainage system may generally include a first drainage conduit formed in an oil sump housing or pan which defines an oil reservoir. The first drainage conduit may be fluidly coupled to an oil outlet passage or flow conduit in the oil pan leading away from the oil filter for receiving filtered oil during normal engine operation. A second drainage conduit formed in the oil pan may be fluidly coupled to an oil inlet passage or flow conduit leading to the oil filter for supplying oil to the filter. The first and second drainage conduits may be fluidly coupled together and configured to form a common discharge conduit. The discharge conduit combines collected oil drainage flows from the first and second drainage conduits and returns the oil to the oil reservoir. The drainage system may be operated prior to replacing the filter so that residual oil accumulated in portions of the normal oil inlet and outlet flow conduits around the oil filter and associated seating surfaces is first collected and returned to the oil reservoir. When the oil filter is then dismounted from the oil pan, the residual oil has been substantially or completely removed already to avoid spills. The residual oil drainage system advantageously eliminates the need for a separate oil catch pan and/or excessive cleanup measures.

A flow control device, which may be located in the common discharge conduit, controls the oil drainage flow through the drainage system. In one implementation, the flow control device has an open non-blocking position allowing oil drainage flow through the system and a closed blocking position completely shutting off drainage flow through the system during normal operation of the engine.

In one implementation, the common discharge conduit of the oil drainage system may be fluidly coupled to an oil fill connection in the oil pan. Oil collected by the drainage system is returned to the reservoir of the oil pan via the oil fill connection. In other implementations, an alternate separate fluid connection to the oil pan reservoir from the drainage system may instead be provided. In one configuration, the engine may be a "small engine" as used in various outdoor gasoline-driven power equipment (e.g. mowers, snowblowers, tractors, etc.) or other equipment. However, the present oil drainage system may also be used with large block automotive or other engines. The engine may be gasoline powered in one non-limiting example.

Advantages of the present residual oil drainage system include: (1) allows oil from the filter to drain back into the crankcase (oil pan reservoir), which results in a clean oil filter replacement and the engine oil to be drained from only one location; (2) the design will work with any filter that can be used on the engine; (3) should not require any or very minor cleaning or wiping of excess oil from engine surfaces when filter is removed; (4) relatively simple mechanical design and ease of use; and (5) drains oil from both sides of the anti-drain back valve in the filter to eliminate two potential sources of spillage when the filter is removed.

In one aspect, an oil drainage system for an internal combustion engine comprises: an oil pan defining a reservoir; an oil filter removably coupled to the oil pan; an oil inlet flow conduit formed in the oil pan and configured for supplying oil to the oil filter; an oil outlet flow conduit formed in the oil pan and configured for receiving oil from the oil filter; a first drainage conduit formed in the oil pan and fluidly coupled to the oil outlet flow conduit; a second drainage conduit formed in the oil pan and fluidly coupled to the oil inlet flow conduit; wherein the first and second drainage conduits are configured to collect and return residual oil from the oil outlet and inlet flow conduits respectively to the reservoir.

In another aspect, an oil drainage system for an internal combustion engine comprises: an oil pan comprising a body defining a reservoir and a filter mounting portion configured for coupling an oil filter thereto; an oil inlet flow conduit formed in the filter mounting portion for conveying oil to the oil filter; an oil outlet flow conduit formed in the filter mounting portion for receiving oil from the oil filter; a first drainage conduit formed in the filter mounting portion, the first drainage conduit fluidly coupled to the oil outlet flow conduit; a second drainage conduit formed in the filter mounting portion, the second drainage conduit fluidly coupled to the oil inlet flow conduit and intersecting the first drainage conduit; a portion of the first drainage conduit defining a common discharge conduit configured to collect and return residual oil to the reservoir from both the oil inlet and outlet flow conduits.

In another aspect, a method for forming an oil drainage system for an internal combustion engine is provided. The method comprises: providing an oil pan comprising a body defining a reservoir and a filter mounting portion configured for coupling an oil filter thereto; forming a first bore in a first direction through the filter mounting portion to define a first oil drainage conduit, the first bore intersecting an oil outlet flow conduit of the oil pan; and forming a second bore in a second direction through the filter mounting portion which transversely intersects the first bore, the second bore defining a second oil drainage conduit and interesting an oil inlet flow conduit of the oil pan; wherein the first and second oil drainage conduits are configured to collect and return residual oil from the oil inlet and outlet flow conduits to the reservoir.

These and other features and advantages of the present invention will become more apparent in the light of the following detailed description and as illustrated in the accompanying drawings.

BRIEF DESCRIPTION OF THE DRAWINGS

The features of the example ("exemplary") embodiments will be described with reference to the following drawings where like elements are labeled similarly, and in which.

Figure 1:
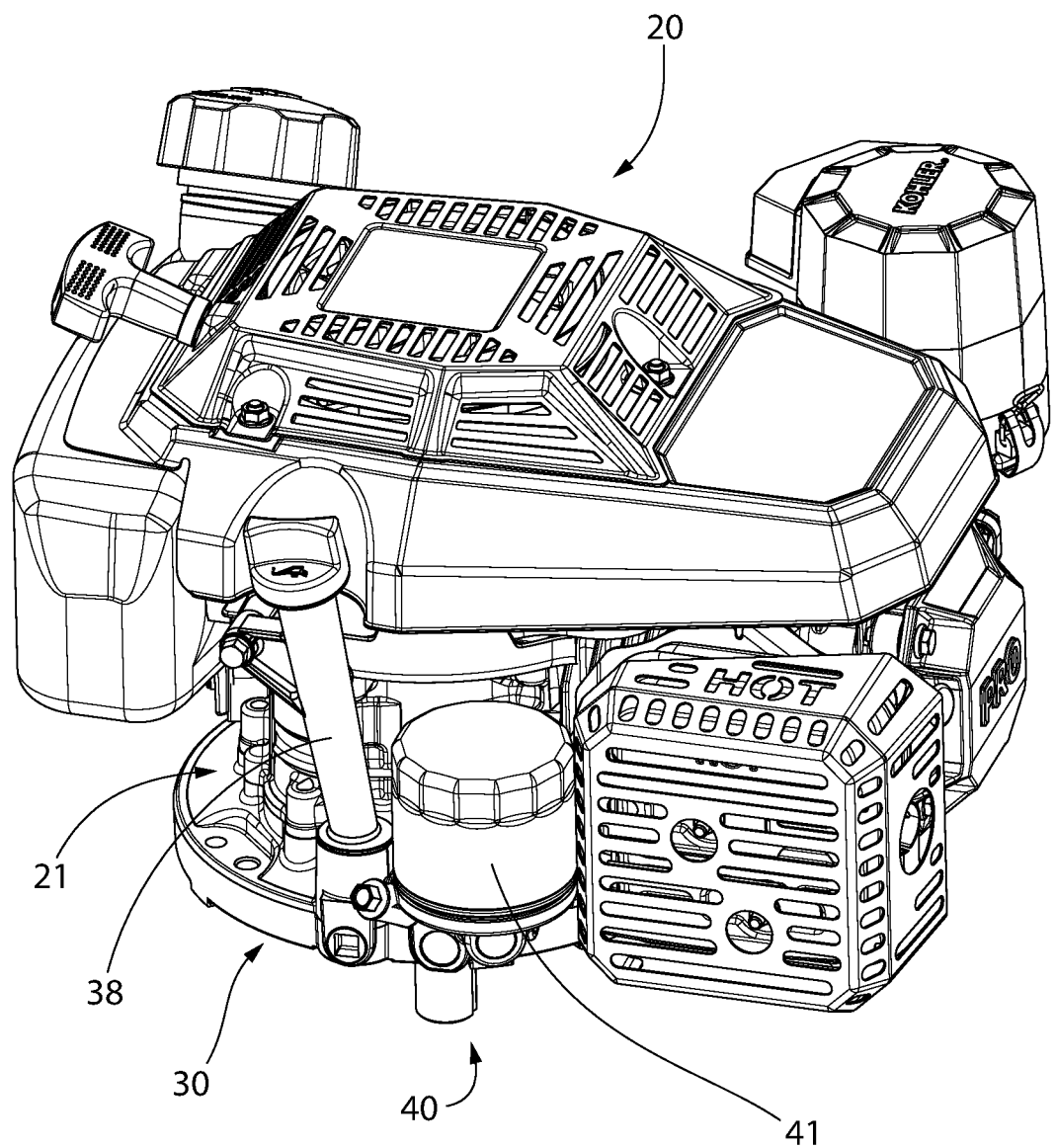
FIG. 1 is a perspective view of an engine with residual oil drainage system according to the present disclosure.
Figure 2:
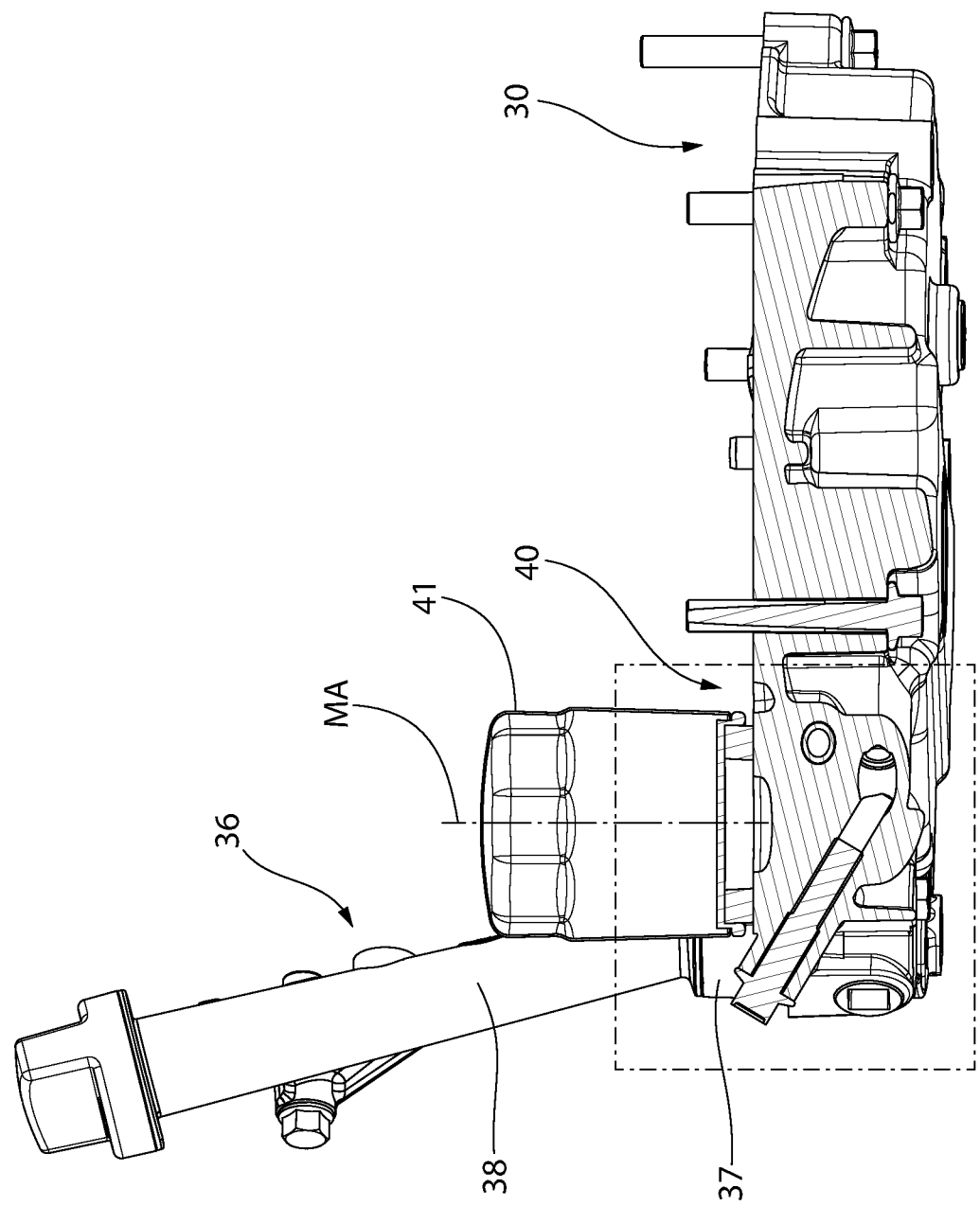
FIG. 2 is a side partial cross-sectional view of the oil pan of the engine with oil filter seated thereon and showing a residual oil drainage conduit network.
Figure 3:
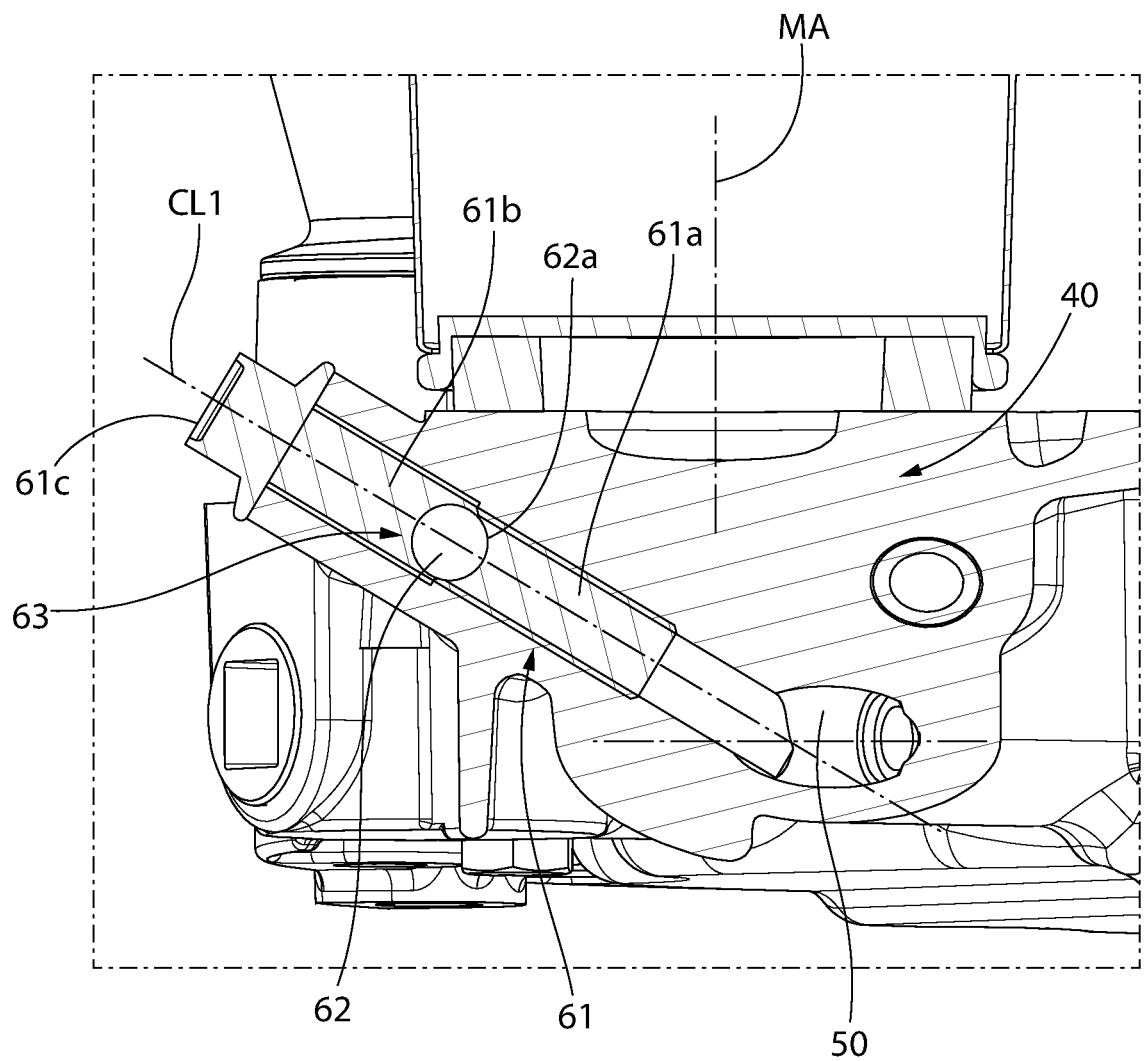
FIG. 3 is an enlarged detail view taken from FIG. 2.

All drawings are schematic and not necessarily to scale. A reference to a figure number herein comprised of a set of multiple figures sharing the same figure number but with different alphabetic suffixes shall be construed as a reference to all those figures in the set unless expressly noted otherwise.

DETAILED DESCRIPTION

The features and benefits of the invention are illustrated and described herein by reference to example ("exemplary") embodiments. This description of example embodiments is intended to be read in connection with the accompanying drawings, which are to be considered part of the entire written description. Accordingly, the disclosure expressly should not be limited to such embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," and "interconnected," refer to a relationship wherein structures are secured or attached to one another either directly or indirectly through intervening structures, as well as both movable or rigid attachments or relationships, unless expressly described otherwise.

FIG. 1 depicts an example of an internal combustion engine with a lubrication oil drainage system associated with the oil filter according to the present disclosure. Engine 20 generally includes one or more cylinders for combusting liquid fuel, an ignition system, lubrication oil system, electrical system, and other usual appurtenances and ancillary equipment associated with a fully functional engine system. Engine 20 includes a housing or crankcase 21 and oil sump housing or pan 30 removably attached to the bottom of the crankcase.

Figure 4:
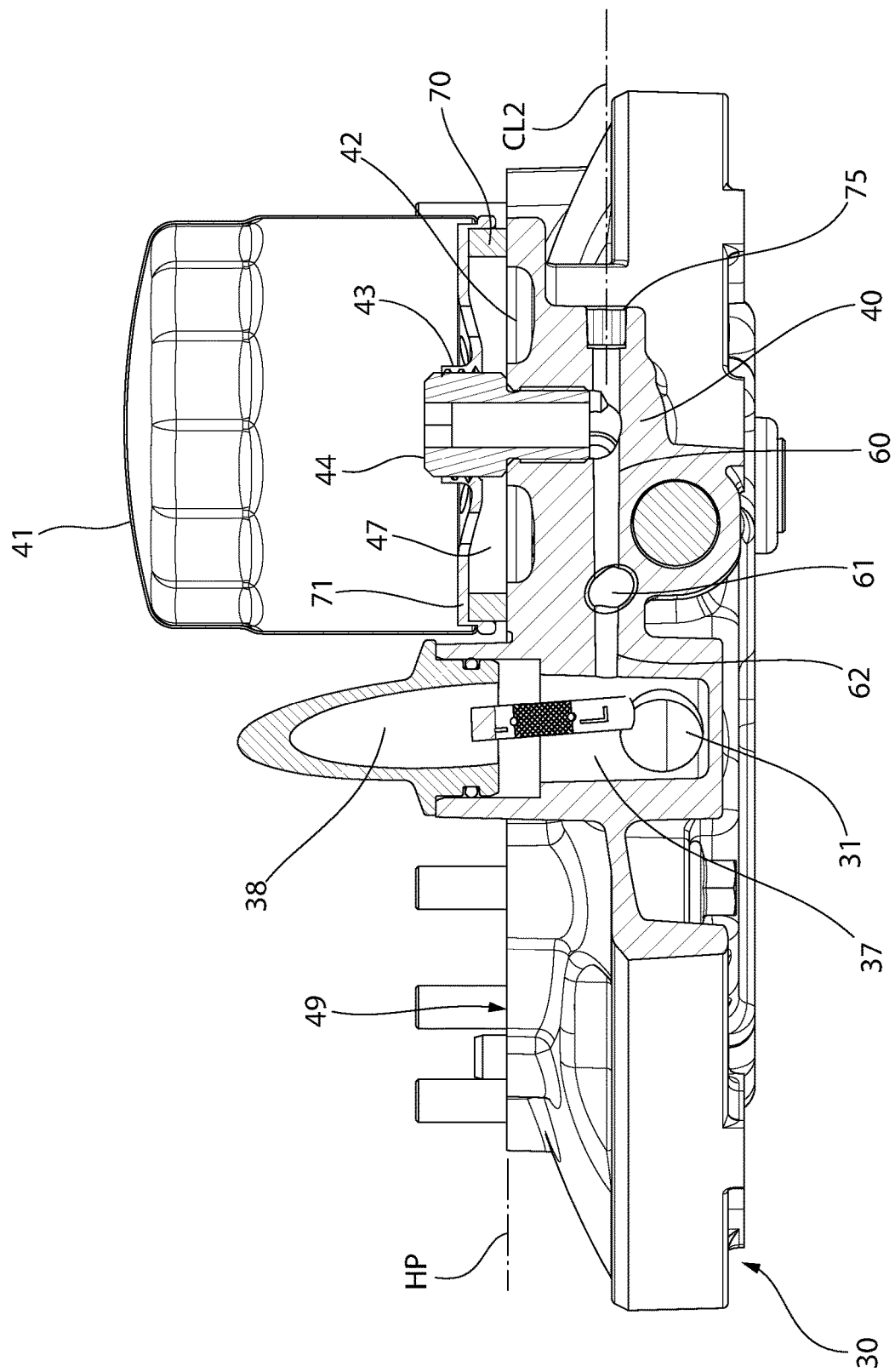
FIG. 4 is a side cross-sectional view of the oil pan and filter.

Referring to FIGS. 1-13, oil pan 30 may be a metal casting including a plurality of mounting apertures 34 for removably attaching the oil pan to the bottom of the crankcase 21 with threaded fasteners (not shown). Oil pan 30 has a body defining a recessed sump or reservoir 31 for holding a reserve of lubrication oil. The oil pan body may be a cast metal or otherwise formed body having a monolithic unitary structure. Reservoir 31 may be defined by a vertical annular wall 32 that extends for a full 360 degrees, thereby forming a continuous structure of any suitable configuration for retaining oil. An oil fill connection 36 is provided for adding oil to the reservoir 31. The fill connection 36 may comprise an oil fill chamber 37 formed in the body of the oil pan and an oil fill tube 38 fluidly coupled thereto. Fill chamber 37 fluidly communicates with and forms a fluid passageway directly into reservoir 31. Fill tube 38 extends upwards and outwards from the fill chamber 37. The fill tube 38 may be mechanically and fluidly coupled to the top of the fill chamber 37 via a leak-resistant sealed connection (see, e.g. FIG. 4). Fill tube 38 is closed at its upper end by a removable oil cap 39. An oil dipstick 39a affixed to cap 39 allows the oil level in reservoir 31 to be checked by a user.

The lubrication system may be a pumped system in one implementation. A raised oil pump mounting protrusion 35-1 may be disposed or formed on the floor 33 of the reservoir 31 for mounting an oil pump 35 (shown in dashed lines in FIG. 5). The oil pump 35 takes suction from the reservoir and pumps oil to the filter 41, from which the oil is distributed to the various moving engine parts which normally require lubrication. The pump mounting protrusion 35-1 may have any suitable configuration.

The oil pan 30 further comprises an oil filter mounting portion 40 configured for removably mounting an oil filter 41 thereto. Mounting portion 40 may be formed integrally with the pan body as a unitary structural part thereof. In one implementation, the mounting portion 40 is formed by a part of the oil pan body casting external to the reservoir 31 so as to be accessible to a user for installing and replacing the oil filter. The mounting portion 40 is configured and arranged for threadably mounting oil filter 41 thereto in a vertical inverted orientation with the threaded coupling end of the filter can in a downwards position. Mounting portion 40 includes an upwardly facing and generally circular seating surface 42 recessed therein. Seating surface 42 sealingly and abuttingly engages the coupling end of the oil filter to form a leak-resistant fluid coupling via an oil seal O-ring 70 which may be disposed on the filter can.

Figure 5:
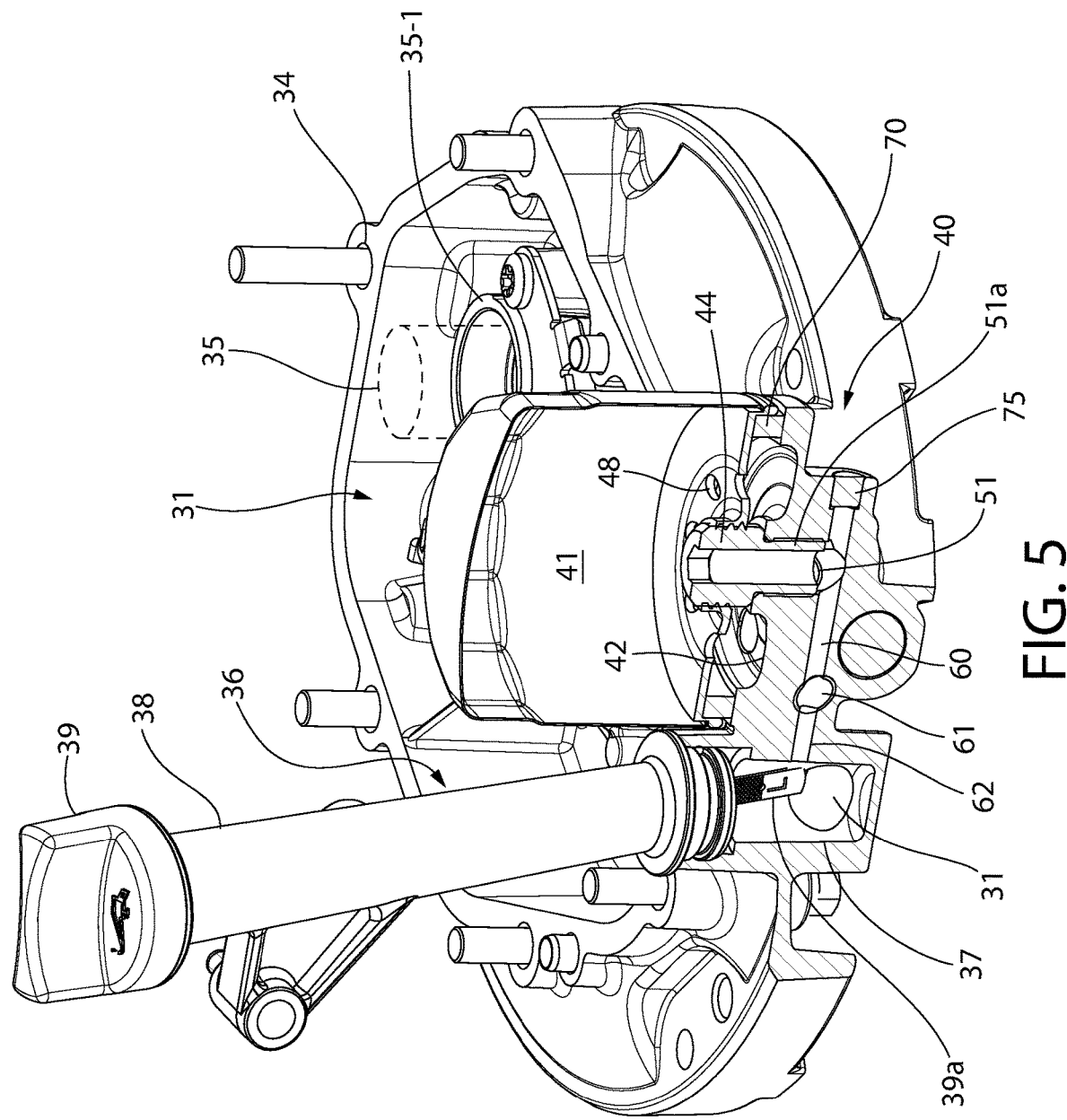
FIG. 5 is a top perspective view of the oil pan with filter and oil fill tube in place.
Figure 6:
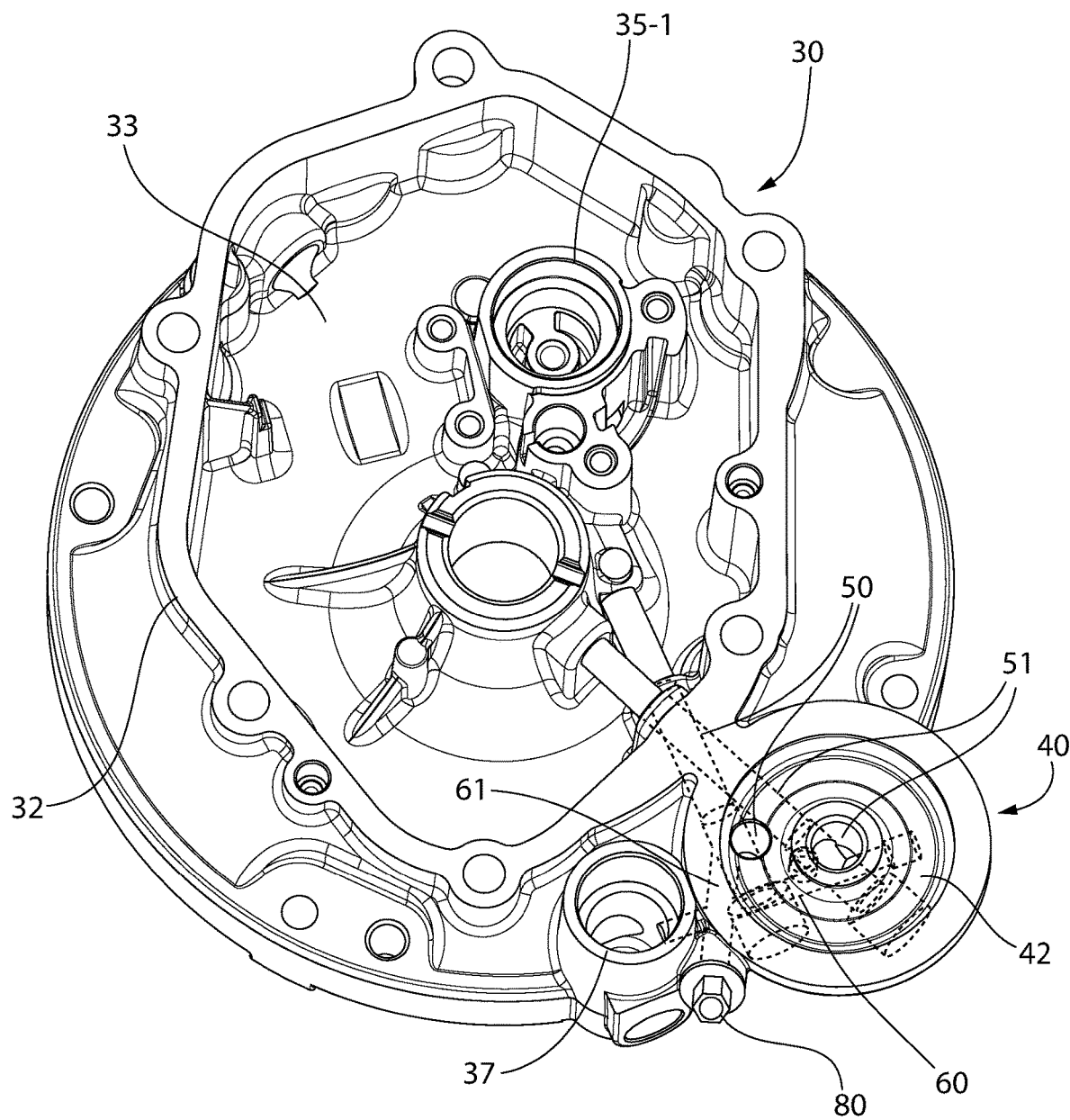
FIG. 6 is a second top perspective view of the oil pan.
Figure 7:
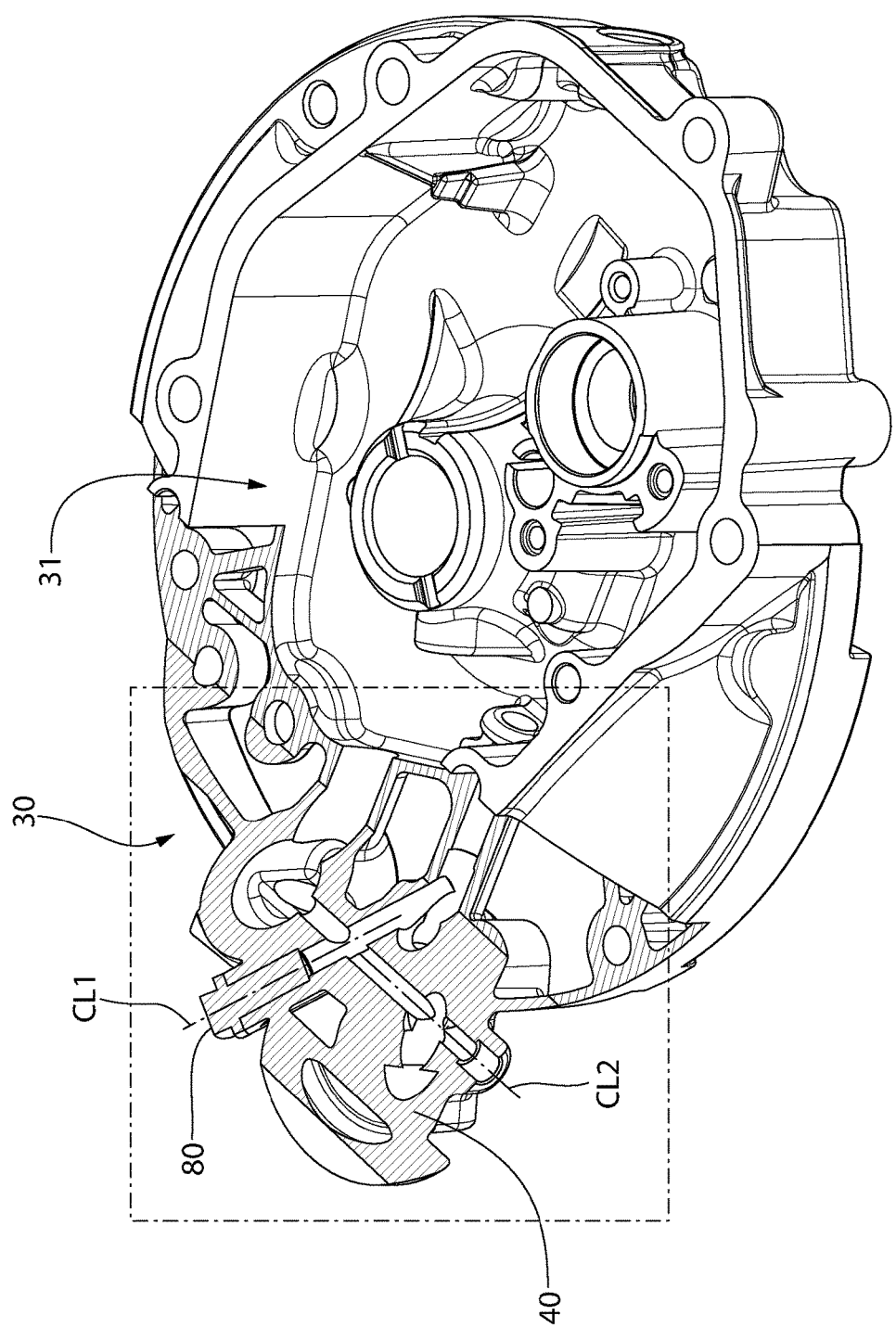
FIG. 7 is a partial cross-sectional perspective view of the oil pan.
Figure 11:
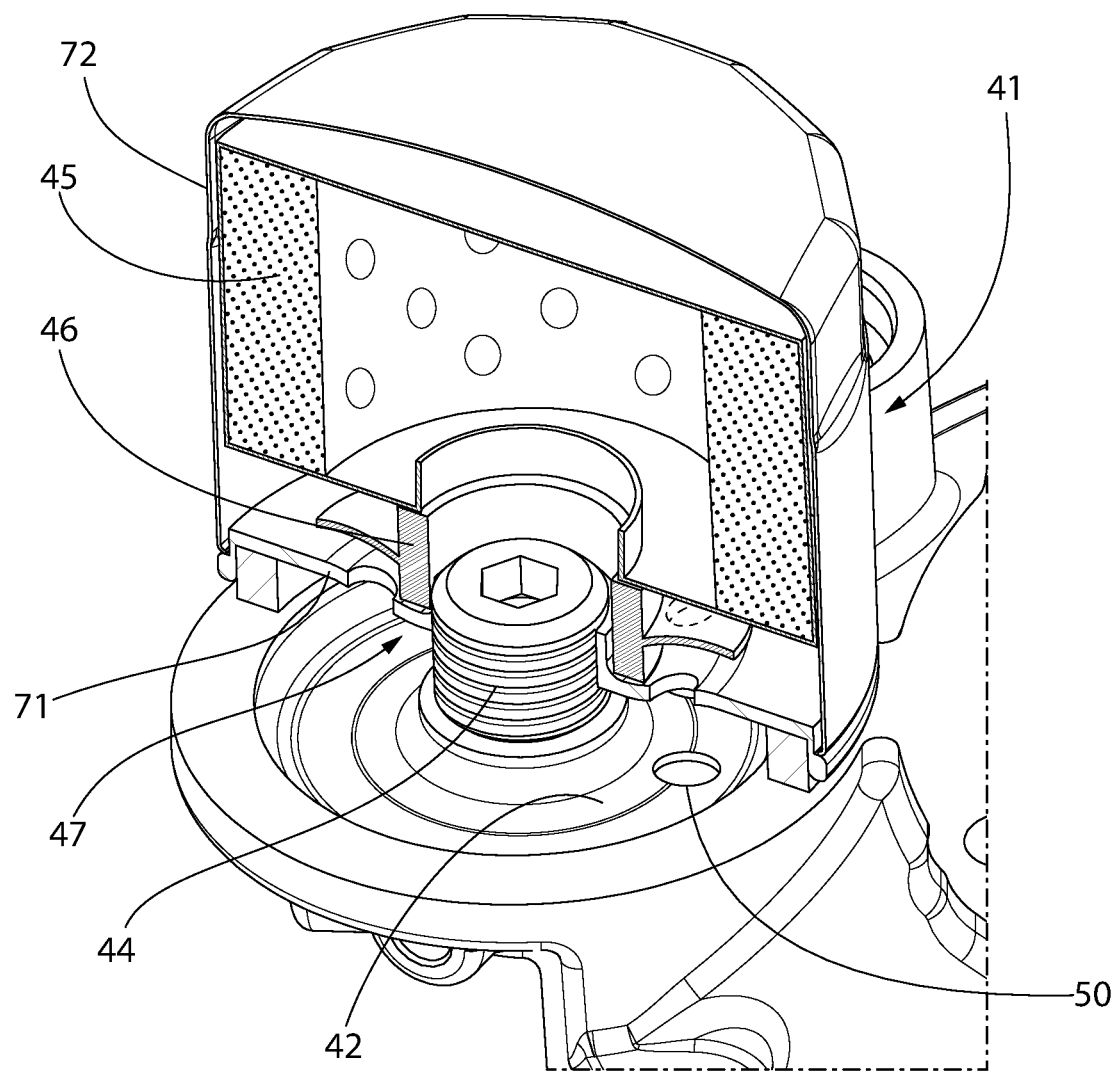
FIG. 11 is a photo showing a side perspective view of the oil filter mounting portion of the oil pan and oil filter in partial cross section.
Figure 12:
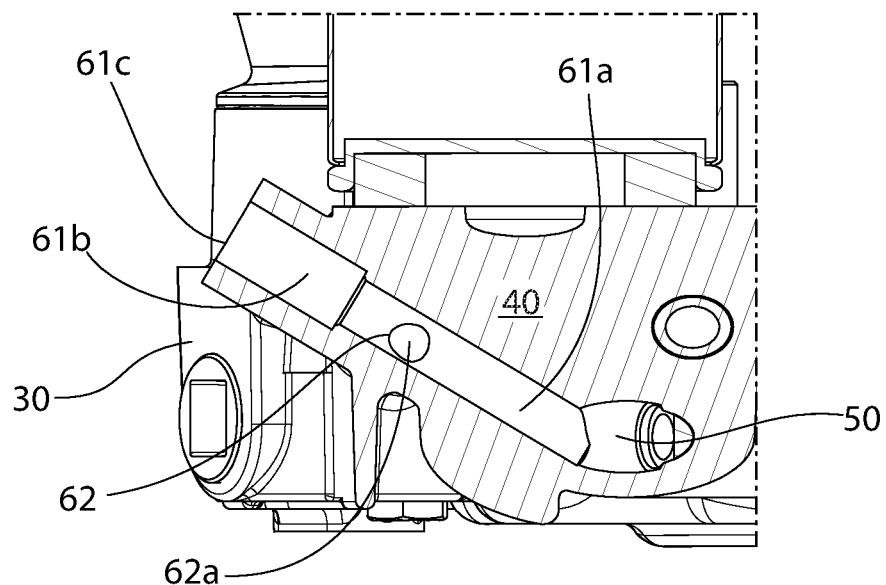
FIG. 12 is a side cross-sectional view of part of the filter mounting portion of the oil pan showing the second drainage conduit.
Figure 13:
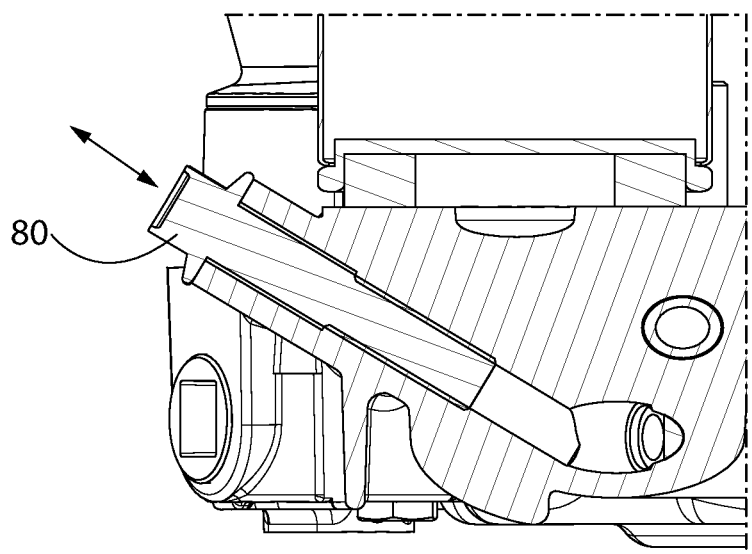
FIG. 13 is a view thereof showing a flow control device installed in the second drainage conduit.
Figure 14:
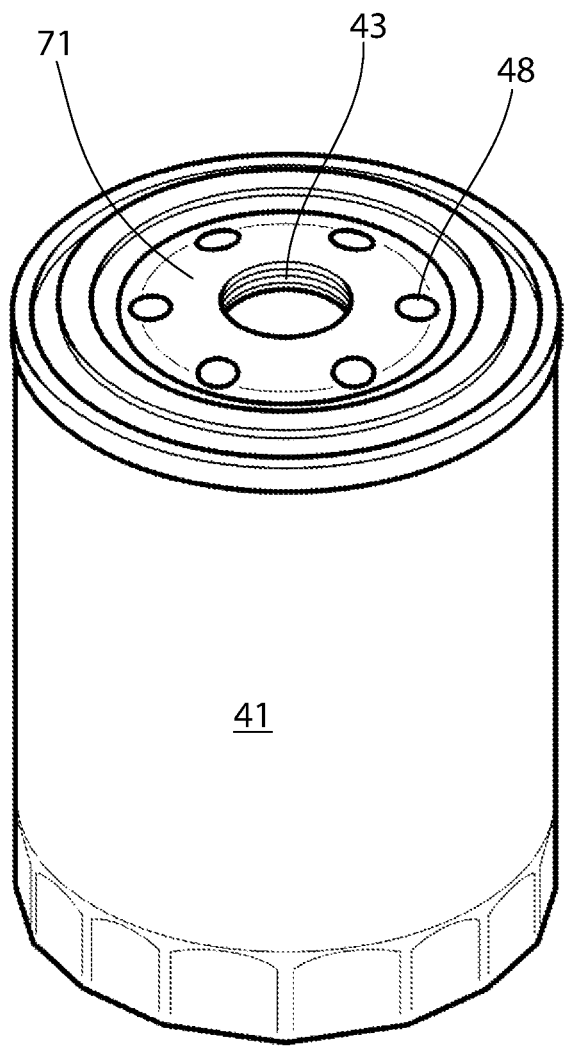
FIG. 14 is a perspective view of the oil filter.

FIG. 14 shows a typical oil filter 41 which may be coupled to mounting portion 40 of oil pan 30. FIGS. 5 and 11 are partial cross-sectional views of the filter coupled to the mounting portion (filter media being omitted in FIG. 5 for clarity). Oil filter 41 includes a cylindrical outer can or housing 72 having a closed top end and an opposite bottom coupling end with a central threaded bore 43. The bore 43 threadably engages a centered externally threaded outlet pipe nipple 44 attached to and extending upwards from the seating surface 42 of oil filter mounting portion 40. In one possible construction, as best shown in FIG. 5, pipe nipple 44 may be formed by a threaded flow coupler having an enlarged upper head with external threads to engage threaded bore 43 of filter 41 and smaller diameter externally threaded shank threadably engaged with an opening in the seating surface 42. Other constructions are possible. An oil outlet flow conduit 51 penetrates the seating surface 42 and fluidly communicates with the outlet pipe nipple 44 for receiving filtered oil discharged from the filter. Filter 41 further includes internal filter media 45 to remove sediment and debris from the oil, and an anti-drain back valve (ADBV) 46. The coupling end of the filter is closed by a cover plate 71 including a plurality of oil inlets 48 for admitting oil into the filter. The ADBV comprises an annular flexible membrane which covers oil inlets 48 when the engine is not operating to prevent the back flow of oil out of the filter. When the filter 41 is coupled to the mounting portion 40 of the oil pan 30, an inlet plenum 47 is formed between the cover plate 71 and seating surface 42 of the mounting portion 40 by a gap therebetween. The seating surface 42 is penetrated by a terminal end of an oil inlet flow conduit 50 for admitting oil into the plenum from oil pump 35.

The inlet flow conduit 50 extends through the oil pan 30 from the discharge of the oil pump 35 to the inlet plenum 47 for supplying unfiltered oil to the oil filter 41. The outlet flow conduit 51 extends through the oil pan from outlet pipe nipple 44 in the filter mounting portion 40 to various oil distribution points in the engine which receive the filtered oil for parts lubrication. In one implementation, the inlet and outlet flow conduits 50, 51 may comprise a combination of tubing sections located within the oil pan reservoir 31 and passageways or bores drilled or otherwise formed through the cast body of the oil pan 30 in the mounting portion 40 of the pan. In the latter, the oil pan body itself forms the pressure retention boundary of the conduits 50, 51 in contrast to the tube walls in the reservoir which form the pressure retention boundary there. The oil flow conduits 50 and 51 may include both horizontal and vertical sections.

In operation, oil flows from the pump 35 through the inlet flow conduit 50 and upwards into the inlet plenum 47 beneath the oil filter 41. The penetration of the inlet flow conduit 50 through the seating surface 42 of the filter mounting portion 40 of the oil pan structure forms an orifice which is laterally offset from the vertical centerline of the oil filter 41. Oil in the inlet plenum 47 flows upwards through the inlets 48 in the filter cover plate 71 and inwards through filter media 45. The filtered oil collects in a central collection chamber of the oil filter 41 and flows downward through the outlet pipe nipple 44 and into the outlet flow conduit 51.

The oil filter mounting portion 40 of oil pan 30 further includes an internal oil drainage system. The oil drainage system collects residual oil which may overflow and spill when replacing the oil filter 41. In one implementation, the drainage system may include a first drainage conduit 60 and a second drainage conduit 61. The first drainage conduit 60 may be fluidly coupled to a portion of the oil outlet flow conduit 51 in the mounting portion 40 leading away from the oil filter 41. Drainage conduit 60 extends substantially horizontally and laterally between a vertical leg 51a of outlet flow conduit 51 beneath seating surface 42 and the oil fill chamber 37 in the oil pan body. This forms a first drainage flowpath from the outlet flow conduit 51a to the chamber 37 to return collected residual oil associated with the oil filter to the oil pan reservoir 31. Any residual oil within the central chamber of the oil filter 41, outlet pipe nipple 44, and vertical leg or section of the outlet flow conduit 51 will drain downwards via gravity into first drainage conduit 60 and flow back to the reservoir via the fill chamber 37. Advantageously, by utilizing the oil fill chamber which connects directly to the reservoir 31, no separate drainage flow return path or connection to the reservoir is required. In one configuration, the first drainage conduit 60 may be slightly sloped towards the fill chamber 37 to better drain residual oil towards the chamber by gravity, but nonetheless may be considered substantially horizontal in orientation relative to the more steeply angled second drainage conduit 61 as further described herein.

Depending on the engine and oil pan configuration involved, in other implementations the first drainage conduit 60 of the residual oil drainage system may be fluidly coupled directly to the reservoir of the oil pan 30 for discharging collection residual oil right into the oil pan reservoir.

The second drainage conduit 61 formed in the filter mounting portion 40 may be fluidly coupled to a portion of the oil inlet flow conduit 50 leading to the oil filter for supplying oil to the filter. Second drainage conduit 61 extends through the oil filter mounting portion 40 of oil pan 30 from an exterior side of the oil pan 30 at one end 61c inwards to the oil inlet flow conduit 50 at a second end 61d of the drainage conduit. Second drainage conduit 61 has a open end 61c which penetrates the side of the oil pan 30 and is exposed directly to atmosphere. Second drainage conduit 61 may further intersect and form a fluid connection to the first drainage conduit 60 via a flow cross arrangement at a fluid connection junction 63 (see, e.g. FIG. 10) creating portions of the conduit 61 on either side of conduit 60. In one configuration, second drainage conduit 61 defines a centerline CL1 which may be obliquely angled or inclined relative to the first drainage conduit 60 and vertical mounting axis MA of the oil filter 41. The second drainage conduit 61 is therefore also obliquely angled relative to a horizontal reference plane HP defined by a flat top surface 49 of the oil pan 30 which forms another basis for reference. Centerline CL1 transversely intersects centerline CL2 of first drainage conduit 60 (see, e.g. FIG. 7). Centerline CL2 may be parallel to reference plane HP or acutely angled thereto if first drainage conduit 60 is slightly sloped as noted above to improve gravity drainage. Open end 61c of second drainage conduit 61 is elevated higher than the opposing end connected to the inlet flow conduit 50 as shown. This arrangement prevents leakage of any residual oil from the second drainage conduit 61 through the open end 61c when draining residual oil, as further described herein.

Second drainage conduit 61 includes an upper portion 61b that extends from the flow cross intersection with first drainage conduit 60 outwards through the side of the oil pan body to atmosphere (best shown in FIGS. 1-2, 7-8, and 12-13). Second drainage conduit 61 has a lower portion 61a that extends between a vertical leg 50a of inlet flow conduit 50 beneath seating surface 42 of filter mounting portion 40 and the first drainage conduit 60. This forms a second drainage flowpath from the inlet flow conduit 50a to the chamber 37 to return collected residual oil associated with an oil filter change back to the oil pan reservoir 31. Any residual oil within the inlet plenum 47 beneath the oil filter 41 will drain back downwards into vertical leg 50a of the inlet flow conduit 50 into lower portion 61a, and then flow into the first drainage conduit 60. The drainage will then continue to flow through the first drainage conduit 60 to the oil fill chamber 37 and finally back into reservoir 31 in oil pan 30.

Figure 8:
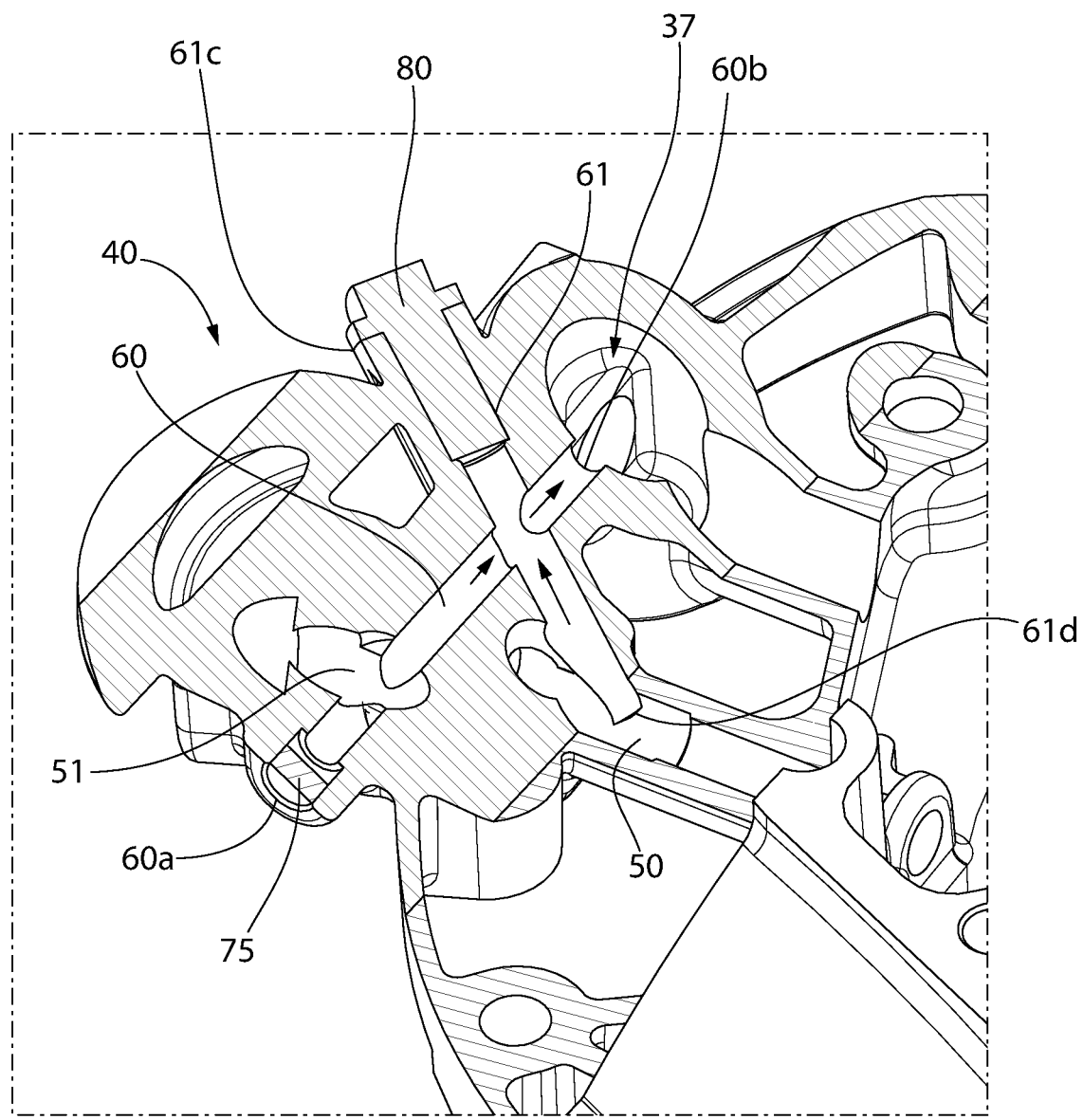
FIG. 8 is an enlarged detail view taken from FIG. 7 showing the oil filter mounting portion of the oil pan.
Figure 9:
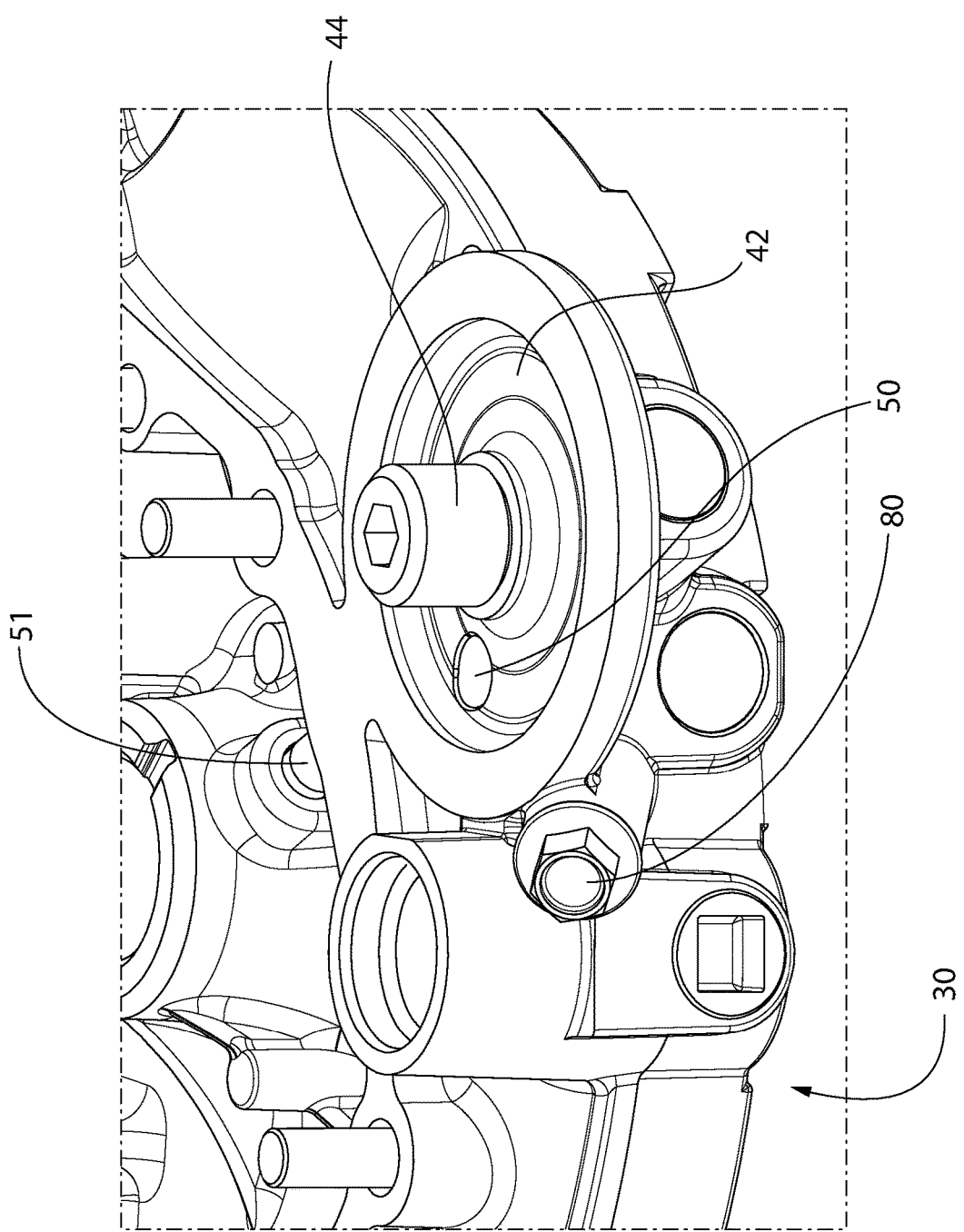
FIG. 9 is top perspective view of the oil filter mounting portion of the oil pan.
Figure 10:
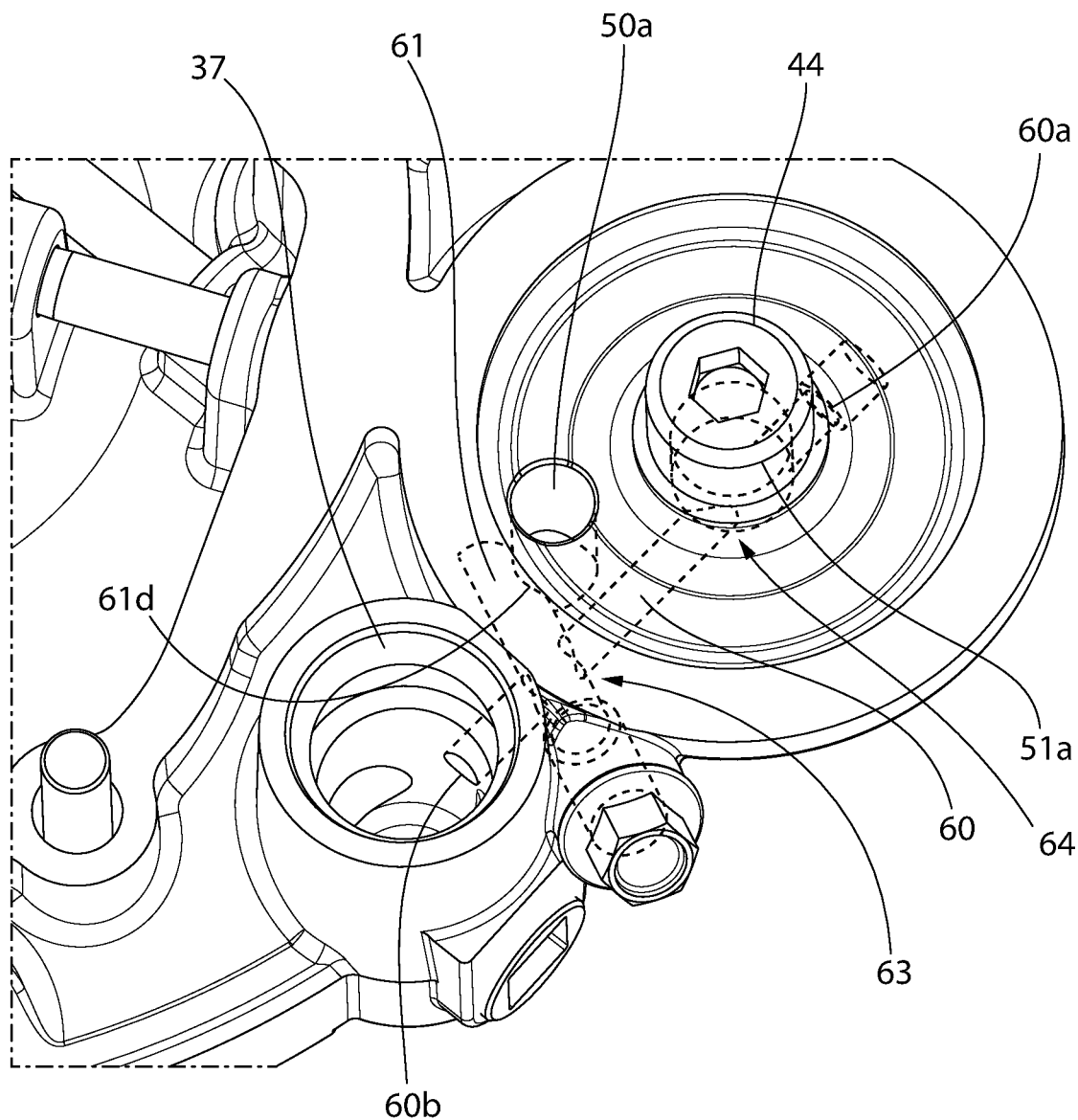
FIG. 10 is a top perspective view thereof showing the first and second drainage conduits in phantom view to portray relative positions and orientations of each.

From one perspective, the last portion or segment of the first drainage conduit 60 between the oil fill chamber 37 of oil pan 30 and flow cross intersection with the second drainage conduit 61 may be considered to define a common oil drainage discharge conduit 62 where the separate residual oil drainage flow streams from the first and second drainage conduits are collected and combined (see, e.g. FIG. 8 flow arrows). The combined flows are then returned to the oil pan reservoir 31 via the fill chamber 37 in the oil pan body. The discharge conduit 62 may be fluidly coupled to the fill chamber 37 via a penetration in a sidewall of the chamber as shown; however, other penetration locations are possible.

Referring to FIGS. 6-10, the first drainage conduit 60 is connected to the oil outlet flow conduit 51 (e.g. vertical leg 51a) at a fluid connection point or junction 64 located between the two ends 60a, 60b of conduit 60. The second drainage conduit 61 is connected to the first drainage conduit 60 at a fluid connection junction 63 which is between the fluid connection junction 64 and the second end 60b of the first drainage conduit at the oil fill chamber 37.

The first and second drainage conduits 60, 61 may each be substantially linear and straight in configuration as shown. This facilitates their formation by boring or drilling into the oil filter mounting portion 40 of the oil pan casting. The drainage conduits 60, 61 may thus comprises bores formed in the filter mounting portion 40 which has a solid construction. The first drainage conduit 60 may be created by drilling inwards from a first side of the oil filter mounting portion 40 of oil pan 30 in a first direction towards and into the oil fil chamber 37 at one end 60b (best shown in FIGS. 3, 8 and 10). This creates an exterior open end 60a of the first drainage conduit 60 to atmosphere, which may be closed by a removable threaded or permanently installed end plug 75 (see, e.g. FIGS. 4, 5 and 8). The second drainage conduit 61 may be formed in similar manner and is aligned to intercept the first drainage conduit 60. Specifically, the second drainage conduit 61 may be created by drilling inwards from a second side of the oil filter mounting portion 40 in a second direction transverse to the first direction and first drainage conduit 60. The second drainage conduit 61 is drilled through the first drainage conduit 60 and past it through at least a portion of the oil inlet flow conduit 50 forming a fluid connection thereto at an end 61d (see, e.g. FIGS. 8 and 10). In one arrangement, the second drainage conduit 61 may intersect a sidewall of the inlet flow conduit 50. The upper and lower portions 61b, 61a of the second drainage conduit 61 and first drainage conduit 60 collectively form a generally cross-shaped oil drainage conduit network. Second drainage conduit 61 transversely intersects and may be obliquely angled relative to the first drainage conduit 60. In other possible configurations, the second drainage conduit 61 may be perpendicularly oriented relative to the first drainage conduit 60.

It bears noting that the first and second drainage conduits 60, 61 may be formed substantially internal to the oil pan structure as shown in this non-limiting example. This advantageously avoids the need for any exposed external flow lines to return residual oil back to the oil pan reservoir 31 which might be subjected to damage. The drainage conduits 60, 61 may be formed in the oil filter mounting portion 40 of the oil pan body beneath the oil filter by any suitable method, such as for example without limitation boring or drilling to establish the desired flow passageways.

During normal operation of the engine, it is desirable to fluidly isolate the common drainage discharge conduit 62 from the residual oil drainage system to the oil fill chamber 37 to allow the oil to follow its normal flowpath through the filter and remainder of the lubrication system. Accordingly, a flow control device may be provided to control the residual oil drainage flow through the drainage system. In one implementation, referring to FIGS. 12 and 13, the flow control device may be a threaded stop plug 80. A threaded fastener of suitable length and configuration such as for example without limitation a hex head cap screw or socket cap screw may be used for plug 80. Plug 80 is removably inserted through the open end 61c of second drainage conduit 61 and serves to close portions of this drainage conduit during normal operation of the engine. Plug 80 threadably engages an internally threaded part of the lower portion 61a of second drainage conduit 61 leading to open end 61c. In some implementations, a rubber seal may be added to plug 80 for improved sealing if needed.

Referring to FIGS. 2, 8, and 12-13, stop plug 80 has a length sufficient to block off the entrance 62a in first drainage conduit 60 to the common discharge conduit 62 when the plug is fully threaded into the open end 61c of the second drainage conduit 61. Entrance 62a is the point at fluid connection junction 63 where the second drainage conduit 61 intersects and is fluidly coupled to the first drainage conduit 60. The stop plug 80 is coaxial with centerline CL1 of second drainage conduit 61 and axially/linearly movable inward and outward via rotating the plug between an open non-blocking position and a closed blocking position. In the closed blocking position, the entrance 62a to common discharge conduit 62 is blocked by the shank of the plug 80 thereby completely shutting off residual oil flow through the drainage system back to the reservoir during normal operation of the engine. In the open non-blocking position, the entrance 62a to discharge conduit 62 is not blocked by the shank of the plug 80 thereby allowing residual oil flow through the drainage system back to the reservoir 31 when the engine is off for maintenance. In one usage, the stop plug 80 may be completely removed from the second drainage conduit 61 when in the open non-blocking position. This advantageously admits air into the residual oil drainage system for alleviating any vacuum formed in the system which might impede the drainage flow of oil. In another usage, the stop plug 80 may be partially unthreaded in the open non-blocking position to a point which opens the entrance 62a to common discharge conduit 62 without complete removal of the plug.

A method for operating the residual oil drainage system according to the present disclosure will now be briefly described. With the engine 20 turned off preferably following normal operation and the oil filter 41 in place, the stop plug 80 will be in the closed blocking position described above. The main oil pan plug (not shown) is first removed from oil pan 30 to drain the reservoir of oil and then stop plug 80 can be removed. This is because the residual oil level is normally above common discharge conduit 62 so the engine oil must be drained below conduit 62 for the present residual oil drainage system to work properly.

The operator or user may then unscrew and rotate stop plug 80 to the open non-blocking position. In one scenario for the present example method, the user may completely remove the stop plug 80 from the second drainage conduit 61 and oil pan 30. Residual oil remaining in the oil filter 41 and associated portions of the normal inlet and outlet flow conduits 50, 51 near the filter as previously described herein flow into the first and second drainage conduits 60, 61. Residual oil flowing in the upwardly angled second drainage conduit 61 will rise and reach a level substantially equal to the entrance 62a to the common discharge conduit 62 (see, e.g. FIGS. 2 and 12). Further progression of the oil up the second drainage conduit 62 is prevented by placement of the entrance 62a between the ends of the second drainage conduit. The oil in the second drainage conduit 61 combines with the oil flowing the first drainage conduit 60 and enters the common discharge conduit 62. The combined flow then enters the oil fill chamber 37 in the body of the oil pan and flows into reservoir 31. The oil filter 41 may next be removed for replacement, with advantageously minimal or no substantial oil spillage. In some implementations of the method, an additional step to "crack" open the filter 41 a little bit to allow more air intake into the drainage system for additional vacuum relief may be used before opening the stop plug 80.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. An oil drainage system for an internal combustion engine, the system comprising:
   an oil pan defining a reservoir;
   an oil filter removably coupled to the oil pan;
   an oil inlet flow conduit formed in the oil pan and configured for supplying oil to the oil filter;
   an oil outlet flow conduit formed in the oil pan and configured for receiving oil from the oil filter;
   a first drainage conduit formed in the oil pan and fluidly coupled to the oil outlet flow conduit;
   a second drainage conduit formed in the oil pan and fluidly coupled to the oil inlet flow conduit;
   wherein the first and second drainage conduits are configured to collect and return residual oil from the oil outlet and inlet flow conduits respectively to the reservoir.

2. The drainage system according to claim 1, wherein the first and second drainage conduits intersect and are fluidly interconnected defining a common discharge conduit fluidly coupled to the reservoir and configured to collect the residual oil from both the first and second drainage conduits.

3. The drainage system according to claim 2, wherein the common discharge conduit is fluidly coupled to an oil fill connection which in turn is fluidly coupled to the reservoir.

4. The drainage system according to claim 3, wherein the common discharge conduit is formed by a portion of the first drainage conduit between the oil fill connection and an intersection with the second drainage conduit.

5. The drainage system according to claim 3, wherein the oil fill connection comprises an upper oil fill tube extending upwards from the oil pan and an oil fill chamber formed in a body of the oil pan, the oil fill chamber being fluidly coupled between both the common discharge conduit and the reservoir.

6. The drainage system according to claim 2, wherein the first drainage conduit forms a residual oil flow pathway from the oil outlet flow conduit to the common discharge conduit, and the second drainage conduit forms a residual oil flow pathway from the oil inlet flow conduit to the common discharge conduit.

7. The drainage system according to claim 1, wherein the oil outlet flow conduit receives residual oil drained internally from the oil filter, and the oil inlet flow conduit receives residual oil drained from an inlet plenum formed between a bottom cover plate of the oil filter and the oil pan.

8. The drainage system according to claim 7, wherein the oil filter is vertically oriented.

9. The drainage system according to claim 2, wherein the first drainage conduit intersects the second drainage conduit at an angle forming a cross-shaped interconnection between the first and second drainage conduits.

10. The drainage system according to claim 2, wherein the second drainage conduit is obliquely angled relative to the first drainage conduit such that a first end of the second drainage conduit which is openable to atmosphere is elevated higher than a second end connected to the first drainage conduit.

11. The drainage system according to claim 10, further comprising a removable stop plug positioned inside the first end of the second drainage conduit and extending downwards through the second drainage conduit, the stop plug movable to selectively open or close the common discharge conduit to allow or block the flow of residual oil respectively.

12. The drainage system according to claim 11, wherein the stop plug threadably engages the second drainage conduit and has a length such that rotating the stop plug moves it linearly to open and close an entrance to the common discharge conduit.

13. The drainage system according to claim 12, wherein the entrance to the common discharge conduit may be opened by partially unthreading the stop plug from the second drainage conduit with the stop plug remaining engaged with the second conduit.

14. The drainage system according to claim 2, wherein the first and second drainage conduits comprise linear bores extending through a body of oil pan.

15. An oil drainage system for an internal combustion engine, the system comprising:
   an oil pan comprising a body defining a reservoir and a filter mounting portion configured for coupling an oil filter thereto;
   an oil inlet flow conduit formed in the filter mounting portion for conveying oil to the oil filter;
   an oil outlet flow conduit formed in the filter mounting portion for receiving oil from the oil filter;

a first drainage conduit formed in the filter mounting portion, the first drainage conduit fluidly coupled to the oil outlet flow conduit;

a second drainage conduit formed in the filter mounting portion, the second drainage conduit fluidly coupled to the oil inlet flow conduit and intersecting the first drainage conduit;

a portion of the first drainage conduit defining a common discharge conduit configured to collect and return residual oil to the reservoir from both the oil inlet and outlet flow conduits.

16. The drainage system according to claim 15, wherein the first and second drainage conduits comprise transversely intersecting linear bores extending through the mounting portion of the oil pan body.

17. The drainage system according to claim 15, wherein the first drainage conduit includes a first end penetrating a first wall of the filter mounting portion of the oil pan body, and a second end fluidly connected to an oil fill chamber configured for adding oil to the reservoir.

18. The drainage system according to claim 17, wherein the first drainage conduit is connected to the oil outlet flow conduit at a first fluid connection junction between the first and second ends.

19. The drainage system according to claim 18, wherein the second drainage conduit is connected to the first drainage conduit at a second fluid connection junction which is between the first fluid connection junction and the second end of the first drainage conduit.

20. A method for forming an oil drainage system for an internal combustion engine, the method comprising:

providing an oil pan comprising a body defining a reservoir and a filter mounting portion configured for coupling an oil filter thereto;

forming a first bore in a first direction through the filter mounting portion to define a first oil drainage conduit, the first bore intersecting an oil outlet flow conduit of the oil pan; and forming a second bore in a second direction through the filter mounting portion which transversely intersects the first bore, the second bore defining a second oil drainage conduit and intersecting an oil inlet flow conduit of the oil pan;

wherein the first and second oil drainage conduits are configured to collect and return residual oil from the oil inlet and outlet flow conduits to the reservoir.

* * * * *